(12) United States Patent
Manton (10) Patent No.: US 8,997,187 B2
(45) Date of Patent: Mar. 31, 2015

(54) DELEGATING AUTHORIZATION TO APPLICATIONS ON A CLIENT DEVICE IN A NETWORKED ENVIRONMENT

(71) Applicant: Sky Socket, LLC, Atlanta, GA (US)

(72) Inventor: John Joseph Manton, Alpharetta, GA (US)

(73) Assignee: AirWatch LLC, Atlanta, GA (US)

( * ) Notice: Subject to any disclaimer, the term of this patent is extended or adjusted under 35 U.S.C. 154(b) by 113 days.

(21) Appl. No.: 13/840,595

(22) Filed: Mar. 15, 2013

(65) Prior Publication Data

US 2014/0282894 A1    Sep. 18, 2014

(51) Int. Cl.
*H04L 9/32* (2006.01)
*G06F 21/33* (2013.01)
*G06F 7/04* (2006.01)
*H04L 29/06* (2006.01)

(52) U.S. Cl.
CPC ........... *G06F 21/335* (2013.01); *H04L 63/0876* (2013.01); *H04L 63/102* (2013.01); *H04L 63/107* (2013.01); *H04L 63/108* (2013.01)
USPC ................ 726/4; 726/1; 726/5; 726/6; 726/9; 713/171

(58) Field of Classification Search
CPC ..... H04L 63/08; H04L 67/125; H04L 41/046; H04W 12/06; H04W 12/08
See application file for complete search history.

(56) References Cited

U.S. PATENT DOCUMENTS

| | | |
|---|---|---|
| 4,679,226 A | 7/1987 | Muehleisen |
| 5,237,614 A | 8/1993 | Weiss |
| 5,446,888 A | 8/1995 | Pyne |
| 5,574,786 A | 11/1996 | Dayan et al. |
| 5,625,869 A | 4/1997 | Nagamatsu et al. |
| 5,631,947 A | 5/1997 | Wittstein et al. |
| 5,799,068 A | 8/1998 | Kikinis et al. |
| 5,826,265 A | 10/1998 | Van Huben et al. |
| 5,864,683 A | 1/1999 | Boebert et al. |

(Continued)

FOREIGN PATENT DOCUMENTS

| | | |
|---|---|---|
| CA | 2149337 A1 | 6/1994 |
| GB | 2346716 A | 8/2000 |

(Continued)

OTHER PUBLICATIONS

Asynchrony Software, Inc., , "PDA Defense User Guide", 726, 2002.

(Continued)

*Primary Examiner* — Dede Zecher
*Assistant Examiner* — Trang Doan
(74) *Attorney, Agent, or Firm* — AirWatch LLC (57) ABSTRACT

A computer-readable medium encoded with software for execution. When executed, the software may be operable to send to a remote server, from an agent application, a request for a first access credential. The software may also be operable to receive from the remote server, the first access credential. The software may further be operable to determine, by the agent application monitoring a managed application, that the managed application requires a second access credential. The software may additionally be operable to, in response to the determination that the managed application requires the second access credential, sending to the managed application, from the agent application, the second access credential.

18 Claims, 4 Drawing Sheets

(56) References Cited

U.S. PATENT DOCUMENTS

| | | |
|---|---|---|
| 5,870,459 A | 2/1999 | Phillips et al. |
| 5,928,329 A | 7/1999 | Clark et al. |
| 5,961,590 A | 10/1999 | Mendez et al. |
| 5,966,081 A | 10/1999 | Chesnutt |
| 5,974,238 A | 10/1999 | Chase, Jr. |
| 5,987,609 A | 11/1999 | Hasebe |
| 6,006,332 A | 12/1999 | Rabne et al. |
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,463,470 B1 | 10/2002 | Mohaban et al. |
| 6,480,096 B1 | 11/2002 | Gutman et al. |
| 6,560,772 B1 | 5/2003 | Slinger |
| 6,606,662 B2 | 8/2003 | Nagasaki |
| 6,636,489 B1 | 10/2003 | Fingerhut |
| 6,668,322 B1 | 12/2003 | Wood et al. |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,480,907 B1 | 1/2009 | Marolia et al. |
| 7,496,847 B2 | 2/2009 | Koehane et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,873,959 B2 | 1/2011 | Zhu et al. |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,099,332 B2 | 1/2012 | Lemay et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,225,381 B2 | 7/2012 | Lemke |
| 8,359,016 B2 | 1/2013 | Lindeman et al. |
| 8,433,620 B2 | 4/2013 | Futty et al. |
| 8,504,831 B2 | 8/2013 | Pratt et al. |
| 8,538,919 B1 * | 9/2013 | Nielsen et al. ............... 707/610 |
| 8,566,249 B2 * | 10/2013 | Johnson .................. 705/64 |
| 2002/0013721 A1 | 1/2002 | Dabbiere et al. |
| 2002/0049644 A1 | 4/2002 | Kargman |
| 2002/0055967 A1 | 5/2002 | Coussement |
| 2002/0098840 A1 | 7/2002 | Hanson et al. |
| 2003/0065934 A1 | 4/2003 | Angelo et al. |
| 2003/0110084 A1 | 6/2003 | Eberhard et al. |
| 2003/0131245 A1 | 7/2003 | Linderman |
| 2003/0172166 A1 | 9/2003 | Judge et al. |
| 2003/0186689 A1 | 10/2003 | Herle et al. |
| 2003/0204716 A1 | 10/2003 | Rockwood et al. |
| 2004/0098715 A1 | 5/2004 | Aghera et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0071748 A1 | 3/2005 | Shipp |
| 2005/0246192 A1 | 11/2005 | Jauffred et al. |
| 2005/0273858 A1 * | 12/2005 | Zadok et al. .................... 726/24 |
| 2006/0190984 A1 | 8/2006 | Heard et al. |
| 2007/0016613 A1 | 1/2007 | Foresti et al. |
| 2007/0033397 A1 | 2/2007 | Phillips, II et al. |
| 2007/0093243 A1 | 4/2007 | Kapadekar et al. |
| 2007/0136492 A1 | 6/2007 | Blum et al. |
| 2007/0150596 A1 * | 6/2007 | Miller et al. .................. 709/226 |
| 2007/0156897 A1 * | 7/2007 | Lim ............................ 709/225 |
| 2007/0174433 A1 | 7/2007 | Mendez et al. |
| 2007/0192588 A1 | 8/2007 | Roskind et al. |
| 2007/0204153 A1 * | 8/2007 | Tome et al. .................... 713/164 |
| 2007/0250918 A1 | 10/2007 | Aboual Chamat |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2008/0051076 A1 | 2/2008 | O'Shaughnessy et al. |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2008/0271015 A1 * | 10/2008 | Ibrahim ........................... 718/1 |
| 2008/0313447 A1 * | 12/2008 | Gillett et al. ..................... 713/1 |
| 2009/0036111 A1 | 2/2009 | Danford et al. |
| 2009/0144632 A1 | 6/2009 | Mendex |
| 2009/0198997 A1 | 8/2009 | Yeap et al. |
| 2009/0253410 A1 | 10/2009 | Fitzgerald et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |

(56) References Cited

U.S. PATENT DOCUMENTS

| | | |
|---|---|---|
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0162370 A1* | 6/2010 | Altay et al. ............ 726/5 |
| 2010/0254410 A1 | 10/2010 | Collins |
| 2010/0257578 A1* | 10/2010 | Shukla et al. ............ 726/1 |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0325628 A1* | 12/2010 | Haga et al. ............ 718/1 |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145585 A1* | 6/2011 | Campagna et al. ............ 713/176 |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0102566 A1* | 4/2012 | Vrancken et al. ............ 726/20 |
| 2012/0179904 A1* | 7/2012 | Dunn et al. ............ 713/155 |
| 2012/0198547 A1 | 8/2012 | Fredette et al. |
| 2012/0204032 A1 | 8/2012 | Wilkins et al. |
| 2012/0300937 A1* | 11/2012 | Burbridge et al. ............ 380/278 |
| 2013/0031599 A1* | 1/2013 | Luna et al. ............ 726/1 |
| 2013/0061307 A1 | 3/2013 | Livne |
| 2013/0086466 A1 | 4/2013 | Levy et al. |
| 2013/0086669 A1 | 4/2013 | Sondhi et al. |
| 2013/0152169 A1 | 6/2013 | Stuntebeck |
| 2014/0006776 A1* | 1/2014 | Scott-Nash et al. ............ 713/156 |
| 2014/0109171 A1 | 4/2014 | Barton et al. |
| 2014/0164775 A1* | 6/2014 | Wu et al. ............ 713/171 |
| 2014/0189797 A1* | 7/2014 | Nori et al. ............ 726/4 |
| 2014/0215574 A1* | 7/2014 | Erb et al. ............ 726/4 |

FOREIGN PATENT DOCUMENTS

| | | |
|---|---|---|
| WO | 0241661 A2 | 5/2002 |
| WO | 2014120691 A1 | 8/2014 |

OTHER PUBLICATIONS

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

Menaria, Pankaj et al., "Security in Mobile Database Systems", 707, 726, Mar. 17, 2011.

Pfitzmann, Andreas et al., "Mobile User Devices and Security Modules: Design for Trustworthiness", 726, Feb. 5, 1996.

Steiner, Jennifer, "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

Gittler, et al., "The DCE Security Service", Hewlett-Packard Journal, Hewlett-Packard Co. Palo Alto, CA US vol. 46, No. 6, Dec. 1, 1995; pp. 41-48.

International Search Report for PCT/US2014/025242 mailed Jul. 18, 2014.

Non-Final Office Action cited in U.S. Appl. No. 13/316,073 dated Jan. 18, 2013.

U.S. Appl. No. 14/097,945 entitled, "Authentication Delegation" filed Dec. 5, 2013.

Non-Final Office Action mailed Nov. 18, 2014, U.S. Appl. No. 14/097,945.

* cited by examiner

DELEGATING AUTHORIZATION TO APPLICATIONS ON A CLIENT DEVICE IN A NETWORKED ENVIRONMENT

BACKGROUND

Controlling access to enterprise resources by network-connected devices is critical to ensure that only authenticated and authorized users, applications, and devices gain access to sensitive information and/or services. To date, this has typically been accomplished by utilizing network firewalls, reverse proxy servers with authentication, and encrypted VPN tunnels. Today, however, enterprise resources are being moved out of enterprise managed data centers and into the "Cloud." These Cloud-based network environments may not provide the configurability and customization necessary to sufficiently protect enterprise resources. For instance, protecting enterprise-managed data centers at a device level can be problematic. Cloud-based data services often do not provide the necessary features to allow enterprises to control access to the service at a device and application-specific levels, but rather permit access, without restriction as to any device, and any application thereon, so long as mere user-specific access controls are adhered to.

BRIEF DESCRIPTION

In some embodiments, a computer-readable medium encoded with software for execution is provided which will allow for delegation of security authorization to an application on a client device. The software, when executed, may be operable to send to a remote server, from an agent application, a request for a first access credential. The software may also be operable to receive from the remote server, the first access credential. The software may further be operable to determine that a managed application requires a second access credential. The software may additionally send to the managed application, from the agent application, the second access credential.

In some embodiments, a method which will allow for delegation of security authorization to an application on a client device is provided. The method may include sending to a remote server, from an agent application, a request. The request may be for a first access credential and authority to delegate the first access credential by granting at least a second access credential to at least a managed application. The method may also include receiving from the remote server, the first access credential and the authority to delegate. The method may further include determining that a managed application requires the second access credential. The method may additionally include sending to the managed application, from the agent application, the second access credential.

In some embodiments, a system which will allow for delegation of security authorization to an application on a client device is provided. The system may include a remote server configured to receive, from an agent application on a client device, a request for a first authorization to access at least one resource on a resource server. The remote server may also be configured to determine, whether the request should be granted. The remote server may further be configured to send, to the agent application on the client device, in response to a determination that the request should be granted, the first authorization and a second authorization to delegate the first authorization to at least a managed application.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Disclosed are various embodiments for systems and methods for delegating security authorization to at least one application executed on a client device. An example system comprises a remote server, a client device, and an enterprise, where the remote server performs functionality for authorizing the client device to access resources stored on a resource server. The remote server may also authorize an application executed on the client device to delegate to managed applications executed on the client device authorization for accessing resources stored on a resource server. In some embodiments, an agent application executed on a client device may send to a remote server a request for authorization to access at least one resource on a resource server. The remote server may receive the request and determine whether the request should be granted. In response to a determination that the request should be granted, the remote server may send to the agent application a first authorization comprising credentials and/or other information needed to access at least one resource on a resource server. The remote server may also send to the agent application a second authorization, which allows the agent application to delegate the first authorization to at least a managed application. In response to receiving the first authorization and the second authorization, the agent application may authorize the managed application to access the at least one resource on a resource server, at least until the first authorization and/or second authorization is/are revoked.

Figure 1:
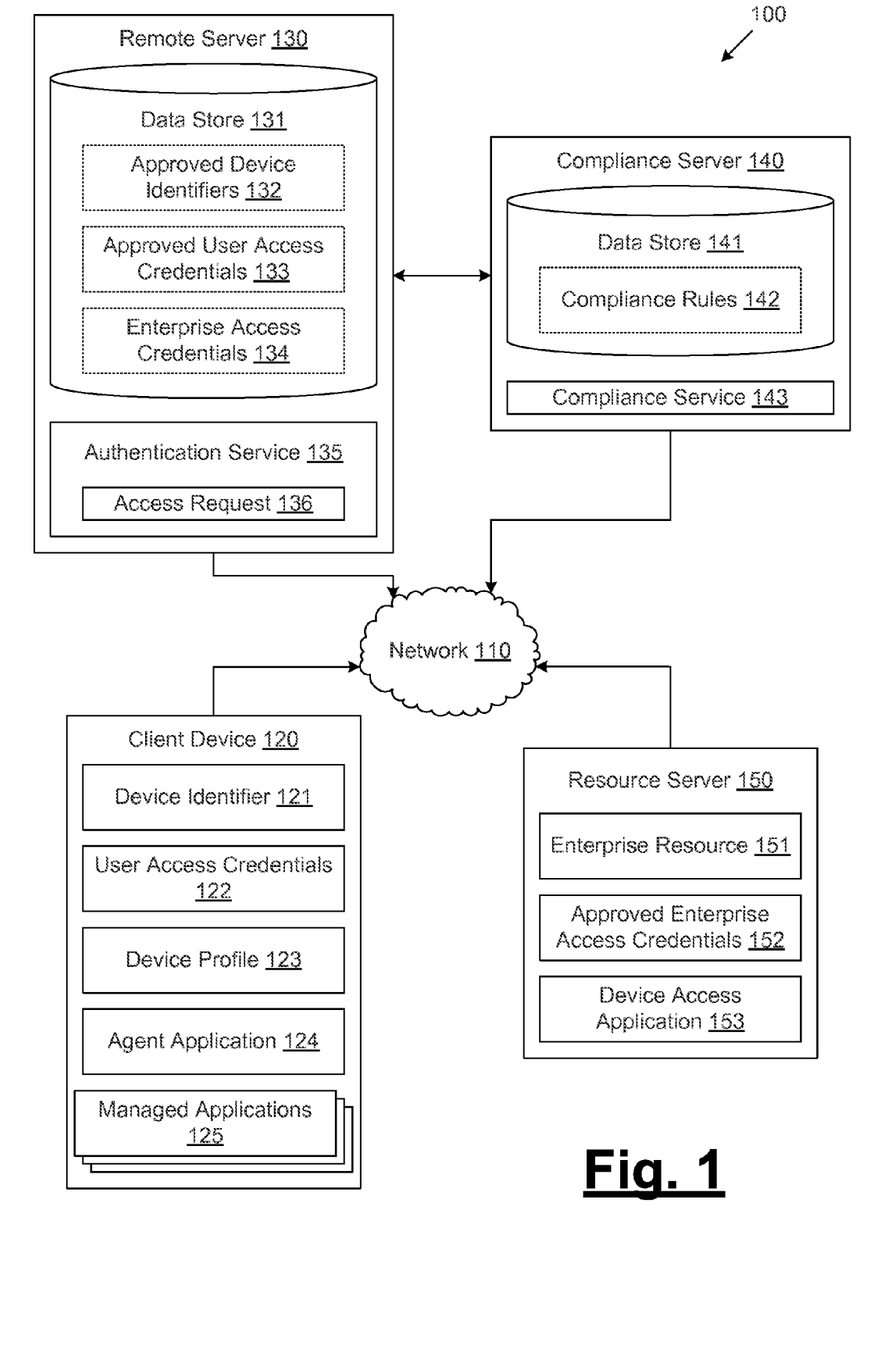
FIG. 1 is a block diagram of a networked environment according to example embodiments.

FIG. 1 illustrates a networked environment 100 according to various embodiments. The networked environment 100 includes a network 110, a client device 120, a remote server 130, a compliance server 140, and a resource server 150. The network 110 includes, for example any type of wireless network such as a wireless local area network (WLAN), a wireless wide area network (WWAN), and/or any other type of wireless network now known and/or later developed. Additionally, the network 110 includes the Internet, intranets, extranets, microwave networks, satellite communications, cellular systems, PCS, infrared communications, global area networks, and/or other suitable networks, etc., and/or any combination of two or more such networks. Embodiments consistent with this disclosure are described below in connection with WWANs (as illustrated in FIG. 1); however, it should be understood that embodiments herein may be used to advantage in any type of wireless network.

In some embodiments, the network 110 facilitates the transport of data between at least one client device, such as client device 120, the remote server 130, the compliance server 140, and the resource server 150. Client devices may include a desktop computer, a laptop computer, a personal digital assistant, a cellular telephone, a set-top step, music players, web pads, tablet computer systems, game consoles, and/or other devices with like capability. Client device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, a modem, a wireless radio transceiver, and/or the like. Additionally, the client device 120 may include a processor for executing applications and/or services, and a memory accessible by the processor to store data and other information. The client device 120 is operable to communicate wirelessly with the remote server 130 and the resource server 150 with the aid of the wireless network connectivity component.

Additionally, the client device 120 may store in memory a device identifier 121, user access credentials 122, a device profile 123, and potentially other data. In some embodiments, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the client device 120. For instance, the device profile 123 may include hardware specifications of the client device 120, version information of various software installed on the client device 120, and/or any other hardware/software attributes. Additionally, the device profile 123 may also include data indicating a date of last virus scan, a date of last access by IT, a date of last tune-up by IT, and/or any other data indicating a date of last device check.

The client device 120 may further be configured to execute various applications such as an "agent application" 124. The agent application 124 may be executed to transmit a request for access to the enterprise resources 151 that are available on the resource server 150. The client device 120 may be configured to execute managed applications 125 such as, for example, browser applications, email applications, instant message applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, the resource server 150, and/or any other computing system.

In some embodiments, the resource server 150 represents an enterprise level computing device that stores and serves up enterprise resources 151, and/or performs other enterprise level functions. For instance, the resource server 150 may store in memory enterprise resources 151, a listing of approved enterprise access credentials 152, and potentially other data. The enterprise resources 151 may be stored in the device, a database accessible by the device, and/or other storage facility in data communication with the resource server 150. In some embodiments, the enterprise resources 151 may include any type of enterprise data, such as, for instance, enterprise documents, files, file systems, and/or any other type of data. In some embodiments, the enterprise resource 151 may include enterprise level applications and services that may be accessed by and executed on another device, such as a client device. For instance, a user operating a client device 120 may invoke an enterprise level application that is then executed on the client device 120. The listing of approved enterprise access credentials 152 may be a list of pre-approved enterprise access credentials 134 that provide access to the enterprise resources 151.

The resource server 150 may further be configured to execute various applications such as a "device access application" 153. The device access application 153 may be executed to receive a request for access to the enterprise resources 151 and determine whether to grant the requested access. For instance, the device access application 153 may receive the request for access from the client device 120, the remote server 130, the compliance server 140, and/or any other computing system. In response, the device access application 153 may then determine whether the enterprise access credentials 134 associated with the requesting device match at least one of the credentials included in the listing of approved enterprise access credentials 152. Based on this determination, the device access application 153 may grant the requesting device access to the enterprise resources 151. The resource server 150 may be configured to execute other enterprise side applications and/or services such as, a mail service, an internet service, a messaging service, and/or other services.

The remote server 130 and the compliance server 140 can each be implemented as, for example, a server computer and/or any other system capable of providing computing capability. Further, the remote server 130 may be configured with logic for performing the methods described herein. Although one remote server 130 and one compliance server 140 is depicted, certain embodiments of the networked environment 100 include more than one remote server 130 and/or compliance server 140. At least one of the servers may be employed and arranged, for example, in at least one server bank, computer bank, and/or other arrangement. For example, the server computers together may include a cloud computing resource, a grid computing resource, and/or any other distributed computing arrangement. Such server computers may be located in a single installation or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store 131 that is part of and/or otherwise accessible to the remote server 130 and/or a data store 141 that is part of and/or otherwise accessible to the compliance server 140. The data stored in each of the data stores 131 and 141, for example, may be accessed, modified, removed, and/or otherwise manipulated in association with the operation of the applications and/or functional entities described herein.

The components executed in the remote server 130 include an authentication service 135, and may include other applications, services, processes, systems, engines, and/or functionality not discussed in detail herein. As used herein, the term "authentication service" is meant to generally refer to computer-executable instructions for performing the functionality described herein for authenticating user access credentials 122 and device identifiers 121. The authentication service 135 is executed to receive an access request 136 from an agent application 124 executed on a client device 120 for accessing enterprise resources 151 and to determine whether to grant or deny the access request 136. Upon determining to grant the access request 136, the authentication service 135 may then associate the client device 120 with enterprise access credentials 134 necessary to access the enterprise resource 151, as will be described. The authentication service 130 may also be able to determine for an approved client device 120 whether or not to issue permission to the agent application 124 to delegate any authority so granted to additional applications executed on the client device 120.

The data stored in the data store 131 of the remote server 130 may include, for example, approved device identifiers 132, approved user access credentials 133, enterprise access credentials 134, and potentially other data. The approved device identifiers 132 represents a listing of device identifiers 121 that have been pre-approved for accessing the enterprise resources 151 stored in the resource server 150. For instance, the approved device identifiers 132 may have been previously provided to the remote server 130 by a system administrator and/or the like. The approved user access credentials 133 represents a listing of user access credentials 122 that have been pre-approved for accessing the enterprise resources 151 stored on the resource server 150. Additionally, the enterprise access credentials 134 may be used to gain access to the enterprise resources 151 stored in the resource server.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as a client device 120. The compliance service 143 is executed to determine whether the device characteristics of the client device 120 comply with the compliance rules 142 that are stored in the data store 141. For instance, the compliance service 143 may identify the device characteristics from the device profile 123 of each client device 120. Additionally, the compliance rules 142 represents a listing of hardware restrictions, software restrictions, and/or mobile device management restrictions that need to be satisfied by the client device 120.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or managed applications 125, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142.

A user operating a client device 120 may wish to access data and/or another resource stored on the resource server 150, such as enterprise resources 151. In some embodiments, the user may interact with an input device to manipulate a network page that displayed by a locally executed application 125, such as a browser application, to generate a request to request access at least one of the enterprise resources 151. In some embodiments, the user may manipulate a user interface generated by a locally executed application 125 to generate a request for access to at least one of the enterprise resources 151. In either case, the user may provide login information, such as, for instance, a unique user name, a password, biometric data, and/or other types of user access credentials 122. The application 125 may then communicate the request for access to the agent application 124, which may generate and transmit an access request 136 to the authentication service 135. In some embodiments, the agent application 124 may transmit the access request 136 directly to the resource server 150. In such an embodiment, the device access application 153 of the resource server 150 may receive the access request 136 and re-route it to the authentication service 135.

Upon receiving the request 136, the authentication service 135 determines whether to grant or deny the access request 136. In some embodiments, the authentication service 135 may first authenticate the client device 120 and the user operating the client device 120. To this end, the authentication service 135 determines whether the device identifier 121 associated with the client device 120 matches one of the identifiers listed in the listing of approved identifiers 132. For instance, the device identifier 121 of the client device 120 may be included as part of the request 136 transmitted by the agent application 124. In some embodiments, the authentication service 135 may request the device identifier 121 from the client device 120 in response to receiving the access request 136. Upon identifying and/or receiving the device identifier 121, the authentication service 135 determines whether the device identifier 121 matches one of the approved identifiers 132 stored in the data store 131. In some embodiments, the authentication service 135 may authenticate the client device 120 dynamically by determining whether the device identifier 121 is within a predetermined range of approved device identifiers 132. In some embodiments, the authentication service 135 may authenticate the client device 120 dynamically by performing an algorithm on the device identifier 121.

Additionally, the authentication service 135 may also authenticate the user operating the client device 120 by determining whether the user access credentials 122 associated with the user match one of the credentials in the listing of approved user access credentials 133. For instance, the user access credentials 122 associated with the user on the client device 120 may be included as part of the access request 136 transmitted by the agent application 124. In some embodiments, the authentication service 135 may request the user access credentials 122 from the client device 120 in response to receiving the access request 136. Upon identifying and/or requesting the user access credentials 122, the authentication service 135 may determine whether the user access credentials 122 matches one of the approved user access credentials 133 stored in the data store 131.

Having authenticated the client device 120 and the user operating the client device 120, the authentication service 135 communicates with the compliance service 143 to authorize the client device 120 for accessing the enterprise resources 151. In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 123. All or part of the device profile 123 may have been provided by the client device 120 in conjunction with the access request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 135. In an alternative embodiment, the authentication service 135 may include and perform functionality for determining whether the client device 120 complies with the compliance rules 143.

If the authentication service 135 determines and/or receives a determination that the client device 120 is authorized, the authentication service 135 then associates the client device 120 with at least one enterprise access credential 134. In some embodiments, the authentication service 135 modifies the access request 136 transmitted by the agent application 124 by replacing the user access credentials 122 with at least one enterprise access credential 134. In some embodiments, the authentication service 135 may modify the access request 136 by also replacing the device identifier 121 with at least one other enterprise access credential 134. The authentication service 135 then relays the modified access request 136 with the enterprise access credentials 134 to the resource server 150 for processing. The authentication service 135 also relays the access credentials 134 to the client device 120 and authorizes the agent application 124 to use such credentials in connection with future requests to access the enterprise resources 151.

The authentication service 135 may also send an authorization to the agent application 124 that allows the agent application 124 to delegate the use of the enterprise access credentials 134 to managed applications 125. The authorizations for the agent application 124 to use and delegate authority to use the enterprise access credentials 134 may include limitations. For example, one or both of the authorizations may be subject to time limitations (e.g., authorization(s) automatically revoked when time limit expires) and/or geographic-based limitations (e.g., authorization(s) automatically revoked when client device 120 is determined to be located outside or inside a specified geographic area). The authorization to delegate authority may also be subject to limitations on the types of, and/or specific, managed applications 125, which may be allowed to use the enterprise access credential to access enterprise resources 151. These limitations may be stored on the remote server 130, compliance server 140, and/or the resource server 150. Such limitations and any other rules may be dependent on which user, device, and/or application are concerned (i.e., a list of potential managed applications 125 for which authority to delegate is requested may be included in the access request 136). Furthermore, the limitations may be affected by device profile 123 information of the requesting client device 120. In some embodiments, limitations, compliance rules 142, and/or other rules may be transmitted to client device 120 for continual compliance checking by the agent application 124 before allowing access to enterprise resources 152 and/or rendering enterprise resources 152 to a user of the client device 120.

The delegation of authority to access enterprise resources 151 may be provided from the agent application 124 to the other application(s) 125 by passing an electronic and/or software token from the agent application 124 to the other application(s) 125. This may occur either upon receipt of the enterprise access credential 134 by the agent application 124, and/or at a later time, such as when the managed application 125 is activated, when the managed application 125 requests the token, and/or when any compliance rules 142 stored on the client device and/or at the compliance server 140 are satisfied by the device profile 123.

The device access application 153 executed on the resource server 150 may receive the modified access request 136 from the authentication service 135 and serves up the requested enterprise resources 151 to the authentication service 135. For instance, the device access application 153 determines whether the enterprise access credentials 134 inserted to the access request 136 match at least one of the approved enterprise access credentials 152. Upon determining that the enterprise access credentials 134 match one of the approved enterprise access credentials 152, the device access application 153 serves up the requested enterprise resource(s) 151. In response, the authentication service 135 relays the enterprise resource(s) 151 to the client device 120. Provided that its authorization to access the enterprise resources has not expired and/or been revoked, the agent application 124 may also formulate access requests 136 using the enterprise access credentials 134 and transmit those requests directly to the enterprise server 150. Upon determining that the enterprise access credentials 134 provided by the agent application 124 match one of the approved enterprise access credentials 152, the device access application 153 may serve up the requested enterprise resources 151 directly to the client device 120.

As previously discussed, the authorization either to access enterprises resources 151 and/or to delegate such authorization may be revoked. Revocation may occur for any number of reasons, including but not limited to, a change in device profile 123, a change in approved enterprise access credentials 152, a change in approved device identifiers 132, a change in approved user access credentials 133, and/or a request from the user of the client device 120.

Figure 2:
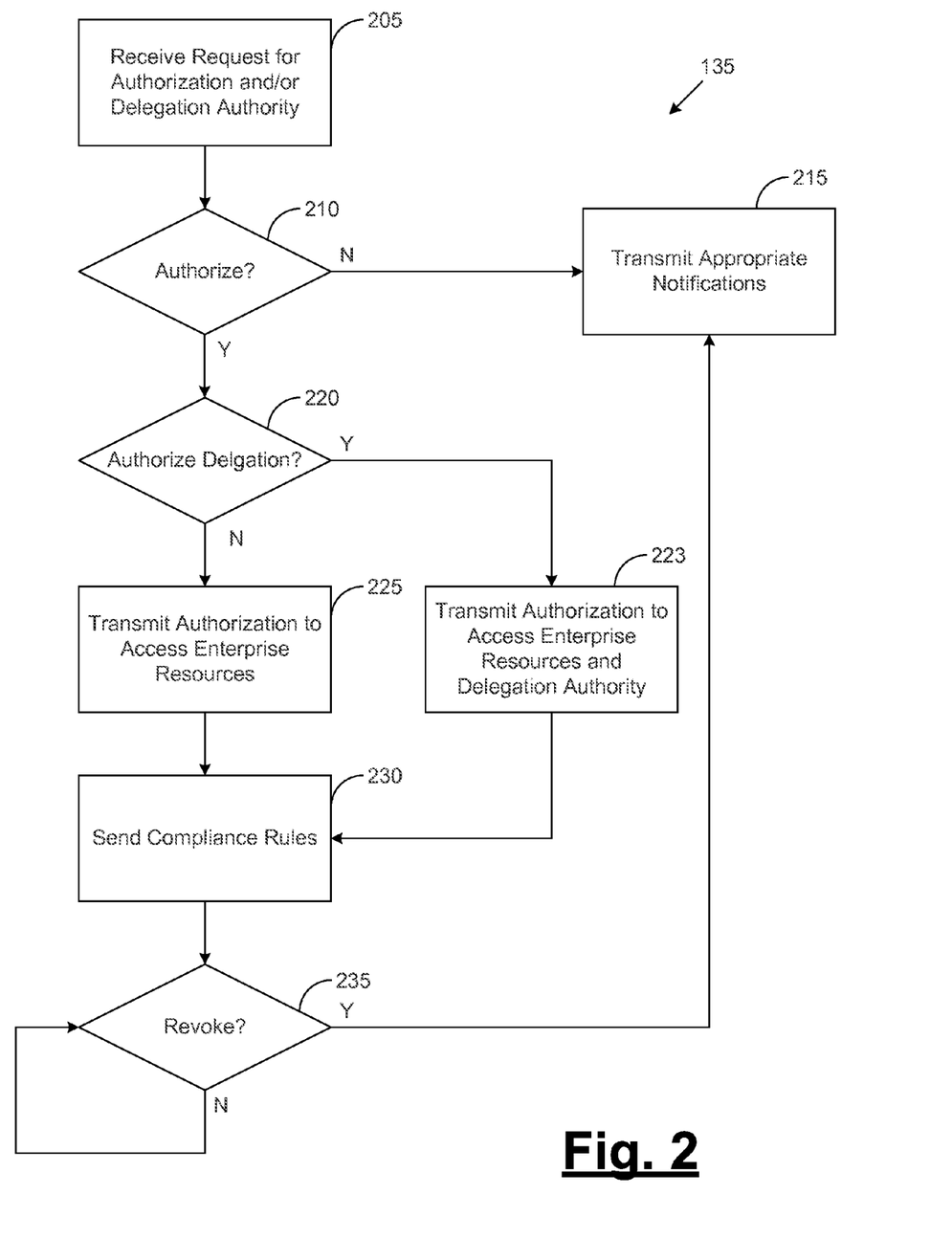
FIG. 2 is a flowchart illustrating example functionality implemented as portions of a remote server in the networked environment of FIG. 1.

FIG. 2 is a flowchart illustrating example functionality implemented as portions of an authentication service 135 executed by a remote server 130 in the networked environment 100 of FIG. 1. At block 205, an access request 136 and/or a request for authorization to delegate authority is received by the authentication service 135 from a client device 120. At block 210, the authentication service 135 determines whether or not the client device 120 is authorized to access resources stored on the resource server 150. As described, this authorization decision may be based on authentication of a device identifier and user credentials and based on compliance by the user device with applicable compliance rules. If the access request 136 is not authorized, then appropriate notifications are transmitted to the client device 120 at block 215. If the access request 136 is authorized, then at block 220 the authentication service 135 determines whether or not delegation authority should be granted to the agent application 124 executed on the client device 120, according to the conditions discussed above. If delegation authority is to be granted, then at block 223 the authentication service 135 sends to the agent application 124 both the authorization to access the enterprise resources and the authorization to delegate such authority to managed applications 125 executed by the client device 120. If delegation authority is not granted at block 220, the authentication service 135 sends to the agent application 124 only the authorization to access the enterprise resources at block 225.

At block 230, compliance rules 142 may also be transmitted to the client device 120 for use by the agent application 124 in determining whether to continue to allow the agent application 124 and/or managed applications 125 to use the enterprise access credential and/or a token granted therefrom. At block 235, the authentication service 135 determines whether or not to revoke either the authorization to access enterprise resources 151 and/or the delegation authority, e.g., based on factors previously mentioned. If the remote server 130 determines to revoke either authority, appropriate notifications are transmitted to the client device 120 at block 215. If not, the remote server 130 awaits further input and/or a change to system parameters which would cause a change in such determination.

Figure 3:
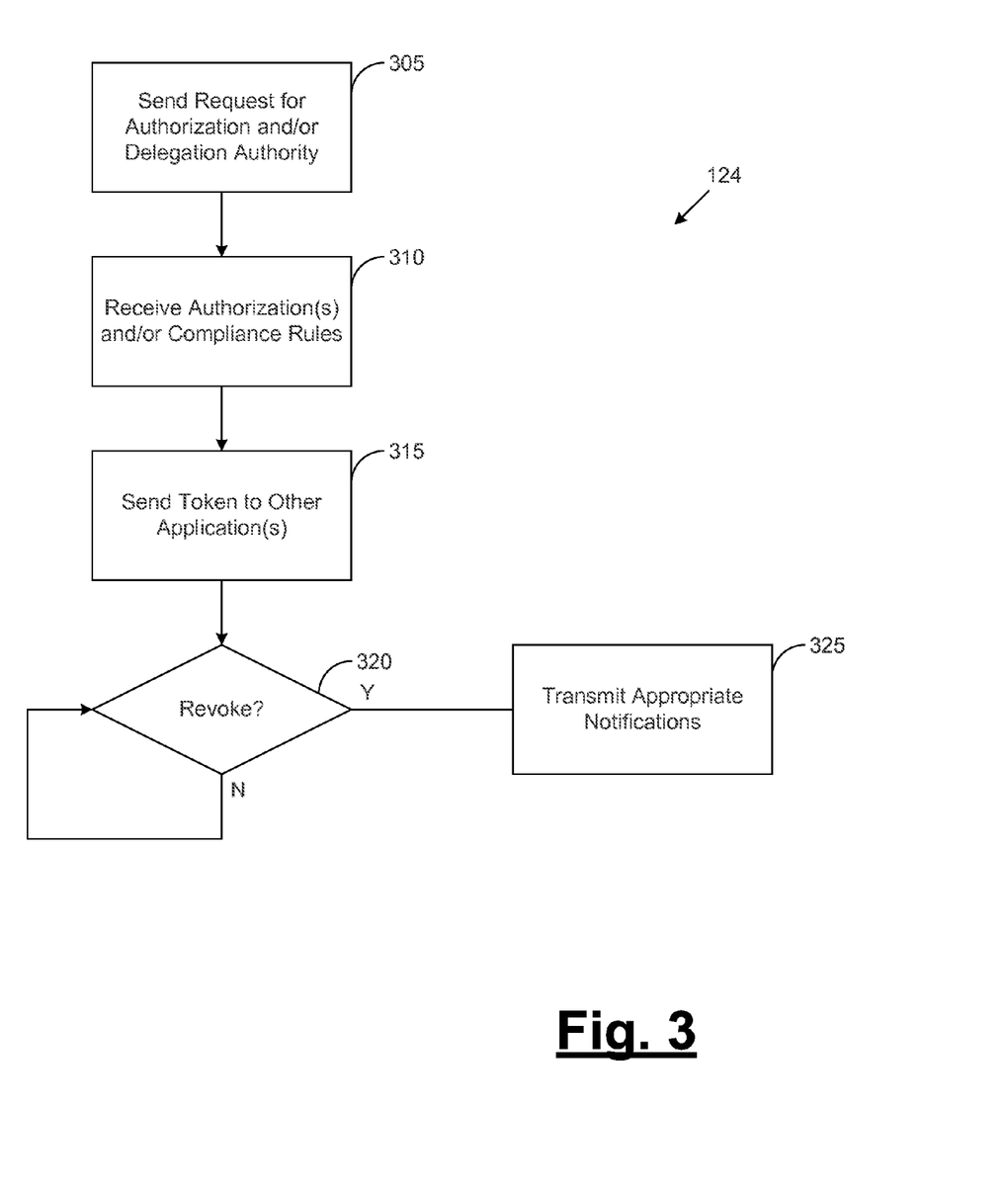
FIG. 3 is a flowchart illustrating example functionality implemented as portions of an agent application executed by a client device in the networked environment of FIG. 1.

FIG. 3 is a flowchart illustrating example functionality implemented as portions of an agent application 124 executed by a client device 120 in the networked environment 100 of FIG. 1. At block 305, the agent application 124 sends an access request 136 and/or a request for authorization to delegate access authority to the authentication service 135. At block 310, the agent application 124 receives the authorization to access enterprises resources 151 and/or any delegation authority provided by authentication service 135. Compliance rules 142 that apply to either such authority may also be received from remote server 130. At block 315, subject to any applicable conditions such as may be specified by the compliance rules 142, the agent application 124 sends delegation tokens to managed applications 125 executed on the client device 120, if such managed applications 125 were previously identified as needing such tokens, and/or later request them. At block 320, the agent application 124 determines whether or not to revoke tokens sent to managed applications 125. For example, the agent application 124 may determine that a token is to be revoked based on a compliance rule and/or other limitation associated with it delegation authority. As another example, the agent application 124 may be instructed by the authentication service 135 that its delegation authority has been revoked. If the client device 120 determines to revoke any tokens, at block 325 appropriate notifications are transmitted to the managed applications 125, as applicable, and to remote server 130 so that such tokens are not honored for access to enterprise resources 151. If tokens are not to be revoked, the agent application 124 awaits further input and/or change to system parameters which would cause a change in such determination.

Figure 4:
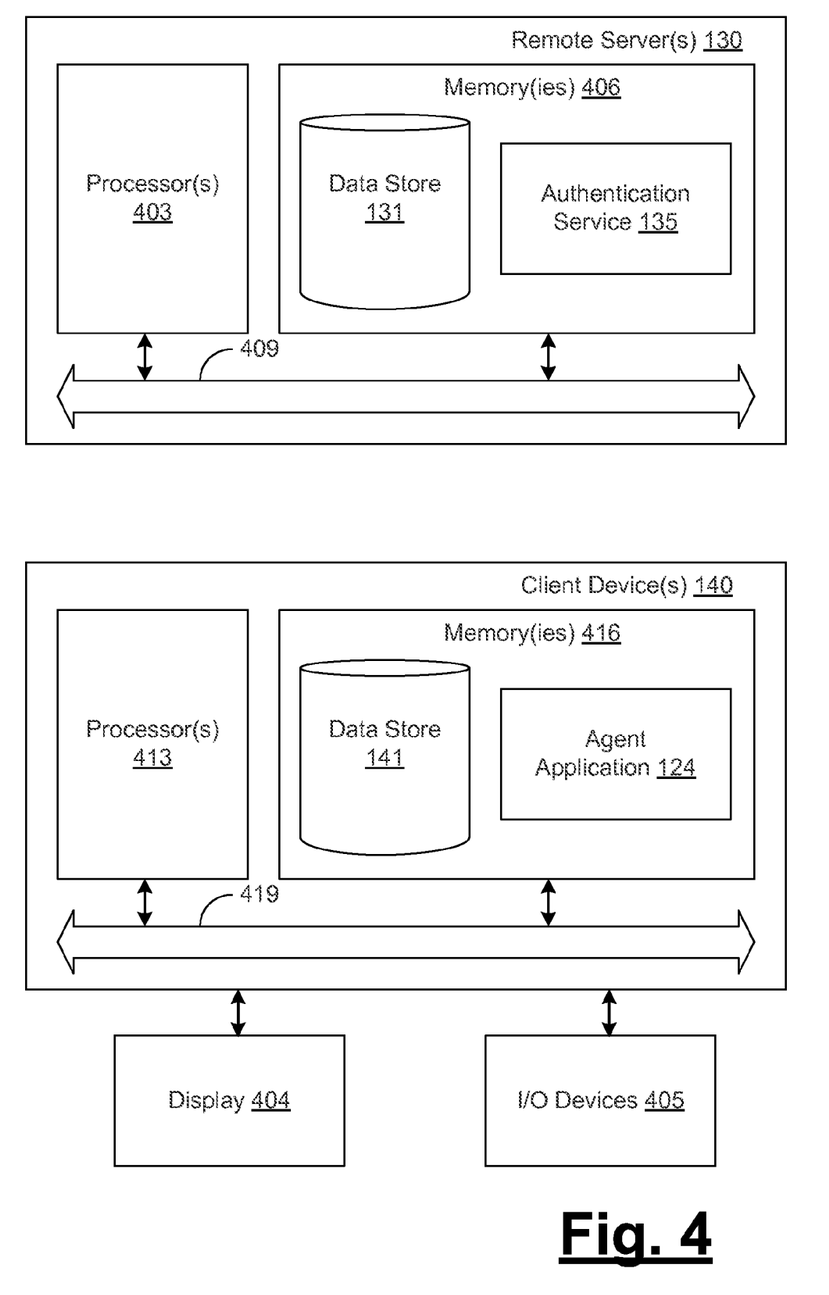
FIG. 4 is a schematic block diagram illustrating a remote server and client device employed in the networked environment of FIG. 1.

With reference to FIG. 4, shown is a schematic block diagram of the remote server 130 and the client device 140 according to an embodiment of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display 404 for rendering user interfaces and at least one other I/O device 405 for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are an authentication service 135, an agent application 124, and potentially other applications. Also stored in the memories 406 and 416 may be a data stores 131 and 141 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gate, and/or other component, etc. Such technologies are generally well known by those skilled in the art and, consequently, are not described in detail herein.

The flowcharts of FIGS. 2 and 3 show the functionality and operation of an implementation of portions of the authentication service 135 and the agent application 124, respectively. If embodied in software, each box may represent a module, segment, and/or portion of code that comprises program instructions to implement the specified logical function(s). The program instructions may be embodied in the form of source code that comprises human-readable statements written in a programming language and/or machine code that comprises numerical instructions recognizable by a suitable execution system such as processors 403 and 413 in a computer system and/or other system. The machine code may be converted from the source code, etc. If embodied in hardware, each block may represent a circuit and/or a number of interconnected circuits to implement the specified logical function(s).

Although the flowcharts of FIGS. 2 and 3 show a specific order of execution, it is understood that the order of execution may differ from that which is depicted. For example, the order of execution of two and/or more blocks may be scrambled relative to the order shown. Also, two and/or more blocks shown in succession in FIGS. 2 and 3 may be executed concurrently and/or with partial concurrence. Further, in some embodiments, at least one of the blocks shown in FIGS. 2 and 3 may be skipped and/or omitted. In addition, any number of counters, state variables, warning semaphores, and/or messages might be added to the logical flow described herein, for purposes of enhanced utility, accounting, performance measurement, and/or providing troubleshooting aids, etc. It is understood that all such variations are within the scope of the present disclosure.

Also, any logic and/or application described herein, including the authentication service 135 and the agent application 124, that comprises software and/or code can be embodied in any non-transitory computer-readable medium for use by and/or in connection with an instruction execution system such as, for example, a processors 403 and 413 in a computer system and/or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, and/or maintain the logic and/or application described herein for use by and/or in connection with the instruction execution system. The computer-readable medium can comprise any one of many physical media such as, for example, magnetic, optical, and/or semiconductor media. More specific examples of a suitable computer-readable medium would include, but are not limited to, magnetic tapes, magnetic floppy diskettes, magnetic hard drives, memory cards, solid-state drives, USB flash drives, and/or optical discs. Also, the computer-readable medium may be a random access memory (RAM) including, for example, static random access memory (SRAM) and dynamic random access memory (DRAM), and/or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), and/or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A non-transitory computer-readable medium encoded with software for execution and, when executed, operable to:
   send to a remote server, from an agent application, a request for a first access credential;
   receive from the remote server, the first access credential;
   determine, by the agent application monitoring a managed application, that the managed application requires a second access credential;
   in response to the determination that the managed application requires the second access credential, sending to the managed application, from the agent application, the second access credential;
   store, by the agent application, an identification of a plurality of managed applications to be monitored for a need of the second access credential; and
   monitor, by the agent application, the plurality of managed applications for the need of the second access credential.

2. The non-transitory computer-readable medium of claim 1, wherein the software is further operable to:
   receive at least one compliance rule; and
   determine if a device profile complies with the at least one compliance rule prior to sending the second access credential.

3. The non-transitory computer-readable medium of claim 1, wherein the software is further operable to:
   determine, by the agent application monitoring the plurality of managed applications, that at least one of the plurality of managed applications requires the second access credential.

4. The non-transitory computer-readable medium of claim 1, wherein:
   determining that the managed application requires the second access credential comprises receiving, at the agent application, a request for the second access credential from the managed application.

5. The non-transitory computer-readable medium of claim 1, wherein:
   determining that the managed application requires the second access credential comprises monitoring, with the agent application, whether the managed application communicated with a resource server.

6. The non-transitory computer-readable medium of claim 1, wherein:
   the request comprises:
      a device identifier;
      a user credential; and
      device profile information.

7. The non-transitory computer-readable medium of claim 1, wherein:
   the request comprises a designation of at least the managed application as an intended delegate.

8. The non-transitory computer-readable medium of claim 1, wherein the software is further operable to:
receive from the remote server a designation of at least the managed application as an allowable delegate.

9. The non-transitory computer-readable medium of claim 1, wherein the software is further operable to:
send, to the managed application, from the agent application, a revocation of the second access credential.

10. The non-transitory computer-readable medium of claim 9, wherein the software is further operable to:
receive instructions, from the remote server, to revoke a delegation of the second access credential.

11. The non-transitory computer-readable medium of claim 9, wherein the software is further operable to:
receive instructions to revoke a delegation of the second access credential from a user.

12. The non-transitory computer-readable medium of claim 1, wherein:
the second access credential comprises a token.

13. The non-transitory computer-readable medium of claim 12, wherein:
the token is transmittable by the managed application to a resource server so as to provide access to the managed application to resources on the resource server.

14. A method comprising:
sending to a remote server, from an agent application, a request for:
 a first access credential; and
 authority to delegate the first access credential by granting at least a second access credential to at least one managed application;
receiving from the remote server, the first access credential and an authority to delegate;
determining that at least one managed application requires the second access credential;
sending to the at least one managed application, from the agent application, the second access credential;
store an identification of a plurality of managed applications to be monitored for a need of the second access credential; and
monitor the plurality of managed applications for the need of the second access credential.

15. The method of claim 14, wherein the method further comprises:
receiving from the remote server at least one compliance rule associated with the first access credential; and
determining if a device profile complies with the at least one compliance rule prior to sending the second access credential.

16. The method of claim 14, wherein the method further comprises:
receiving from the remote server at least one compliance rule associated with the authority to delegate; and
determining if a device profile complies with the at least one compliance rule prior to sending the second access credential.

17. A system comprising:
a remote server configured to:
 receive, from an agent application on a client device, a request for a first authorization to access at least one resource on a resource server;
 determine whether the request should be granted; and
 send, to the agent application on the client device, in response to a determination that the request should be granted, the first authorization and a second authorization to delegate the first authorization to at least a managed application;
 initiate storage in the agent application of an identification of a plurality of managed applications to be monitored for a need of a second authorization; and
 initiate monitoring by the agent application of the plurality of managed applications for the need of the second authorization.

18. The system of claim 17, wherein:
the remote server is further configured to:
 receive, from the agent application on the client device, a designation of at least the managed application; and
 determine if the managed application is an approved application.

* * * * *

UNITED STATES PATENT AND TRADEMARK OFFICE
CERTIFICATE OF CORRECTION

PATENT NO. : 8,997,187 B2  
APPLICATION NO. : 13/840595  
DATED : March 31, 2015  
INVENTOR(S) : Manton et al.

Page 1 of 1

It is certified that error appears in the above-identified patent and that said Letters Patent is hereby corrected as shown below:

Title Page, Item (12) delete "Manton" and insert --Manton et al.--.

Title Page, Item (72) Inventor, should read

--(72) Inventors: John Joseph Manton, Alpharetta, GA (US); Adam Stephen Rykowski, Decatur, GA (US); Sridhara Babu Kommireddy, Alpharetta, GA (US)--.

Signed and Sealed this  
Twenty-fourth Day of November, 2015

Michelle K. Lee  
*Director of the United States Patent and Trademark Office*